US009232137B2

(12) United States Patent
Lammers

(10) Patent No.: US 9,232,137 B2
(45) Date of Patent: Jan. 5, 2016

(54) MOTION BLUR AVOIDANCE

(71) Applicant: Microsoft Corporation, Redmond, WA (US)

(72) Inventor: Michael J. Lammers, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/869,823

(22) Filed: Apr. 24, 2013

(65) Prior Publication Data
US 2014/0320679 A1 Oct. 30, 2014

(51) Int. Cl.
G03B 17/00 (2006.01)
H04N 5/228 (2006.01)
H04N 5/232 (2006.01)
G03B 17/38 (2006.01)

(52) U.S. Cl.
CPC ............ *H04N 5/23258* (2013.01); *G03B 17/38* (2013.01); *H04N 5/23216* (2013.01); *H04N 5/23229* (2013.01); *H04N 5/23245* (2013.01); *G03B 2217/005* (2013.01)

(58) Field of Classification Search
CPC ................ G03B 2217/005; H04N 5/23229; H04N 5/23245; H04N 5/23258; H04N 5/23216
USPC .............................................. 396/52, 54, 420
See application file for complete search history.

(56) References Cited

U.S. PATENT DOCUMENTS

| | | | |
|---|---|---|---|
| 3,627,920 A | 12/1971 | Schroeder et al. | |
| 6,517,260 B2* | 2/2003 | Stiehler et al. | 396/419 |
| 6,628,842 B1 | 9/2003 | Nagao | |
| 7,027,087 B2* | 4/2006 | Nozaki et al. | 348/231.99 |
| 7,856,171 B2* | 12/2010 | Bang et al. | 396/52 |
| 8,244,053 B2 | 8/2012 | Steinberg et al. | |
| 8,289,400 B2 | 10/2012 | Brunner et al. | |
| 9,036,943 B1* | 5/2015 | Baldwin | 382/284 |
| 2004/0066981 A1 | 4/2004 | Li et al. | |
| 2004/0119875 A1* | 6/2004 | Hayaishi et al. | 348/362 |
| 2005/0203430 A1 | 9/2005 | Williams et al. | |
| 2005/0243178 A1 | 11/2005 | McConica | |
| 2006/0012699 A1 | 1/2006 | Miki | |
| 2010/0171846 A1* | 7/2010 | Wood et al. | 348/231.99 |

(Continued)

FOREIGN PATENT DOCUMENTS

GB 2456587 A 7/2009
KR 10-20070069302 A 7/2007

OTHER PUBLICATIONS

Horstmeyer, Roarke, "Camera Motion Tracking for Deblurring and Identification", Retrieved at <<http://web.media.mit.edui~roarkehicameramotion_RWH.pdf>>, Retrieved Date: Mar. 25, 2013, pp. 7.

(Continued)

*Primary Examiner* — W B Perkey
(74) *Attorney, Agent, or Firm* — Danielle Johnston-Holmes; Micky Minhas

(57) ABSTRACT

Various embodiments provide a wearable camera that is configured to take a cluster of photographs and use image processing techniques to select a photograph with a lesser amount of blur than other photographs in the cluster. The wearable camera can include one or more of a gyroscope or accelerometer for ascertaining the camera's motion. Motion data associated with the camera's motion is utilized to ascertain when to take an automatic photograph.

20 Claims, 6 Drawing Sheets

(56) References Cited

U.S. PATENT DOCUMENTS

| | | | |
|---|---|---|---|
| 2010/0257252 A1* | 10/2010 | Dougherty et al. | 709/217 |
| 2010/0309334 A1* | 12/2010 | James et al. | 348/231.2 |
| 2011/0128350 A1 | 6/2011 | Oliver et al. | |
| 2012/0062691 A1* | 3/2012 | Fowler et al. | 348/36 |
| 2012/0154633 A1* | 6/2012 | Rodriguez | 348/231.99 |
| 2012/0188405 A1* | 7/2012 | Morrison et al. | 348/231.2 |
| 2013/0057713 A1 | 3/2013 | Khawand | |
| 2013/0151523 A1* | 6/2013 | Hsi | 707/737 |
| 2014/0055629 A1* | 2/2014 | Ochi et al. | 348/208.1 |

OTHER PUBLICATIONS

Hodges, et al., "SenseCam: A Wearable Camera which Stimulates and Rehabilitates Autobiographical Memory", Retrieved at <<http://research.microsoft.com/en-us/um/cambridge/projects/sensecam/pdf_files/memory.pdf>>, In Memory, vol. 19, No. 7, Oct. 2011, pp. 18.

"The World's First Intelligent Wearable Camera", Retrieved at <<http://www.autographercom/Output/sequences#sequences>>, Retrieved Date: Mar. 25, 2013, pp. 6.

"International Search Report and Written Opinion Issued for PCT Patent Application No. PCT/US2014/034851", Mailed Date: Feb. 16, 2015, 14 Pages.

"International Preliminary Report on Patentability Issued in PCT Application No. PCT/US2014/034851", Mailed Date: Jun. 19, 2015, 7 Pages.

* cited by examiner

MOTION BLUR AVOIDANCE

BACKGROUND

Photos can end up being blurry because of a number of reasons including that the photographer is moving at the time that the photos are taken. This is particularly the case with cameras that can be worn by the photographer, e.g., head-mounted or body-mounted cameras.

SUMMARY

This Summary is provided to introduce a selection of concepts in a simplified form that are further described below in the Detailed Description. This Summary is not intended to identify key features or essential features of the claimed subject matter.

Various embodiments provide a camera, such as a wearable or otherwise mountable camera, that is configured to take a cluster of photographs and use image processing techniques to select a photograph with a lesser amount of blur than other photographs in the cluster.

In yet other embodiments, a camera includes one or more of a gyroscope or accelerometer. The gyroscope and/or accelerometer are utilized to ascertain the camera's motion. Motion data associated with the camera's motion is utilized to ascertain when to take an automatic photograph.

Various other embodiments provide a camera that is configured to adjust exposure time, i.e., shutter time, based on input associated with the camera's motion and the level of brightness in the camera's environment.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
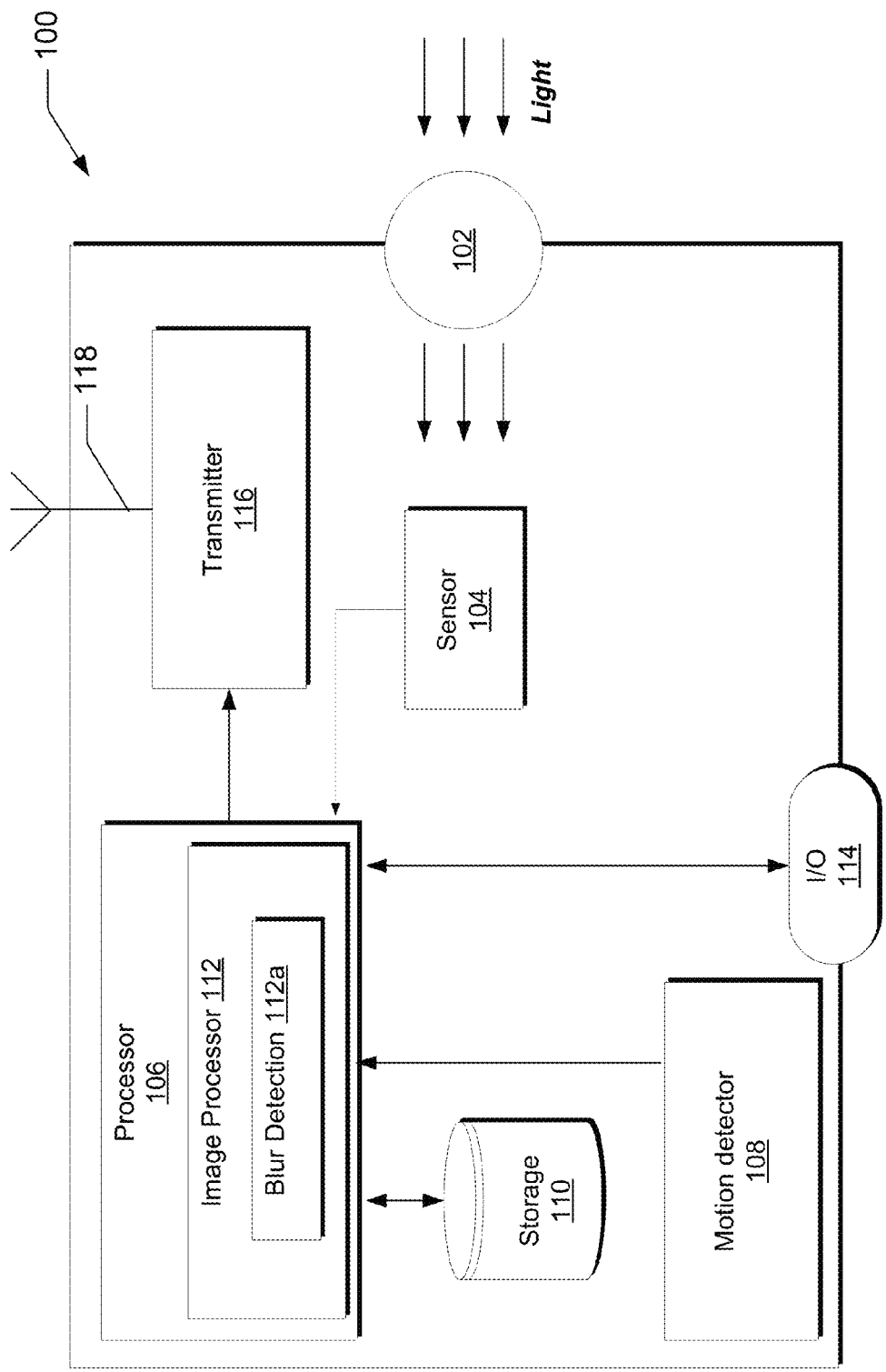
FIG. 1 is an example camera device in accordance with one or more embodiments.

Various embodiments provide a camera, such as a wearable or otherwise mountable camera, that is configured to take a cluster of photographs and use image processing techniques to select a photograph with a lesser amount of blur than other photographs in the cluster. The camera can be worn in any suitable location. For example, the camera can be worn on a user's head such as, a way of example and not limitation, a hat-mounted camera, headband-mounted camera, glasses-mounted camera, helmet-mounted camera, and the like. Alternately or additionally, the camera can be worn on locations other than the user's head. For example, the camera can be configured to be mounted on the user's clothing. Alternately or additionally, the camera can be mounted on various objects, such as objects that move, e.g., vehicles, animals, conveyances and the like.

In yet other embodiments, a camera includes one or more of a gyroscope or accelerometer. The gyroscope and/or accelerometer are utilized to ascertain the camera's motion. Motion data associated with the camera's motion is utilized to ascertain when to take an automatic photograph. For example, a motion threshold may be set and, when the camera is taking pictures in an automatic mode, when the motion threshold is satisfied, the camera may begin taking pictures. Any suitable type of motion threshold can be utilized, as will become apparent below.

Various other embodiments provide a camera that is configured to adjust exposure time, i.e., shutter time, based on input associated with the camera's motion and the level of brightness in the camera's environment. For example, the camera can include one or more of an accelerometer or gyroscope to capture motion data associated with the camera. The motion data, together with information associated with the level of brightness in the camera's environment can be utilized to adjust the camera's shutter speed to achieve a desirable trade-off between motion blur and brightness.

Various other embodiments provide a camera that is mountable on a user's clothing or other objects. The camera is designed to be unobtrusive and user-friendly insofar as being mounted away from the user's face so as not to interfere with their view. In at least some embodiments, the camera includes a housing and a clip mounted to the housing to enable the camera to be clipped onto the user's clothing. The camera is designed to be lightweight with its weight balanced in a manner that is toward the user when clipped to the user's clothing.

In the discussion that follows, a section entitled "Example Environment" describes an example environment in which the various embodiments can be utilized. Following this, a section entitled "Duel Encoding" describes an embodiment in which captured image data can be dual encoded in accordance with one or more embodiments. Next, a section entitled "Photo Log" describes an example photo log in accordance with one or more embodiments. Following this, a section entitled "Taking Photo Clusters and Selecting Images Based on Image Processing" describes various embodiments in which clusters of photos can be taken and selected based on image processing. Next, a section entitled "Using an Accelerometer and/or Gyroscope to Determine Camera Motion" describes various embodiments in which camera motion can be determined and processed. Following this, a section entitled "Using Motion Data and Brightness to Adjust Camera Shutter Time" describes how motion data and brightness can be used to adjust a camera's shutter time in accordance with one or more embodiments.

Consider now an example environment in which various embodiments can be practiced.

Example Environment

FIG. 1 illustrates a schematic of a camera device 100 in accordance with one or more embodiments. The camera device 100 includes a lens 102 having a focal length that is suitable for covering a scene to be pictured. In one embodiment, a mechanical device may be included with the lens 102 to enable auto or manual focusing of the lens. In another embodiment, the camera device 100 may be a fixed focus device in which no mechanical assembly is included to move the lens 102. A sensor 104 having a sensing surface (not shown) is also included to convert an image formed by the incoming light on the sensing surface of the sensor 104 into a digital format. The sensor 104 may include a charge-coupled device (CCD) or complementary metal oxide semiconductor (CMOS) image sensor for scanning the incoming light and creating a digital picture. Other technologies or devices may be used so long as the used device is capable of converting an image formed by the incoming light on a sensing surface into the digital form. Typically, these image detection devices determine the effects of light on tiny light sensitive devices and record the changes in a digital format.

It should be appreciated that the camera device 100 may include other components such as a battery or power source and other processor components that are required for a processor to operate. However, to avoid obfuscating the teachings, these well-known components are being omitted. In one embodiment, the camera device 100 does not include a view finder or a preview display. In other embodiments, however, a preview display may be provided. The techniques described herein can be used in any type of camera, and are particularly effective in small, highly portable cameras, such as those implemented in mobile telephones and other portable user equipment. Thus, in one embodiment, the camera device 100 includes hardware or software for making and receiving phone calls. Alternately, the camera device 100 can be a dedicated, stand-alone camera.

In at least some embodiments, the camera device 100 further includes a motion detector 108 that can include an accelerometer and/or a gyroscope. The accelerometer is used for determining the direction of gravity and acceleration in any direction. The gyroscope may also be used either in addition to the accelerometer or instead of the accelerometer. The gyroscope can provide information about how the rotational angle of the camera device 100 changes over time. Any other type of sensor may be used to detect the camera's motion. Using the rotational angle, an angle of rotation of the camera device 100 may be calculated, if the camera device 100 is rotated. Further included is an input/output (I/O) port 114 for connecting the camera device 100 to an external device, including a general purpose computer. The I/O port 114 may be used for enabling the external device to configure the camera device 100 or to upload/download data. In one embodiment, the I/O port 114 may also be used for streaming video or pictures from the camera device 100 to the external device. In one embodiment, the I/O port may also be used for powering the camera device 100 or charging a rechargeable battery (not shown) in the camera device 100.

The camera device 100 may also include an antenna 118 that is coupled to a transmitter/receiver (Tx/Rx) module 116. The Tx/Rx module 116 is coupled to a processor 106. The antenna 118 may be fully or partly exposed outside the body of the camera device 100. However, in another embodiment, the antenna 118 may be fully encapsulated within the body of the camera device 100. The Tx/Rx module 116 may be configured for Wi-Fi transmission/reception, Bluetooth transmission/reception or both. In another embodiment, the Tx/Rx module 116 may be configured to use a proprietary protocol for transmission/reception of the radio signals. In yet another embodiment, any radio transmission or data transmission standard may be used so long as the used standard is capable of transmitting/receiving digital data and control signals. In one embodiment, the Tx/Rx module 116 is a low power module with a transmission range of less than ten feet. In another embodiment, the Tx/Rx module 116 is a low power module with a transmission range of less than five feet. In other embodiments, the transmission range may be configurable using control signals received by the camera device 100 either via the I/O port 114 or via the antenna 118.

The camera device 100 further includes a processor 106. The processor 106 is coupled to the sensor 104 and the motion detector 108. The processor 106 may also be coupled to storage 110, which, in one embodiment, is external to the processor 106. The storage 110 may be used for storing programming instructions for controlling and operating other components of the camera device 100. The storage 110 may also be used for storing captured media (e.g., pictures and/or videos). In another embodiment, the storage 110 may be a part of the processor 106 itself.

In one embodiment, the processor 106 may include an image processor 112. The image processor 112 may be a hardware component or may also be a software module that is executed by the processor 106. It may be noted that the processor 106 and/or the image processor 112 may reside in different chips. For example, multiple chips may be used to implement the processor 106. In one example, the image processor 112 may be a Digital Signal Processor (DSP). The image processor can be configured as a processing module, that is a computer program executable by a processor. In at least some embodiments, the processor 112 is used to process a raw image received from the sensor 104 based, at least in part, on the input received from the motion detector 108. Other components such as Image Signal Processor (ISP) may be used for image processing. In one or more embodiments, the image processor 112 includes a blur detection module 112a that is configured to detect blurring that may occur in a captured image, such as a photograph, because of movement of the camera and/or subject. Any suitable type of blur detection techniques can be utilized. For example, suitable techniques are described in (1) Tong et al., *Blur Detection for Digital Images Using Wavelet Transform*, Multimedia and Expo, 2004, IEEE International Conference on Jun. 27-30, 2004, Volume 1, pgs. 17-20; and (2) U.S. Pat. No. 7,257,273, to name just a few. The camera is configured, in some embodiments, to take a cluster of photographs and use image processing techniques, such as blur detection, to select a photograph with a lesser amount of blur than other photographs in the cluster.

In one embodiment, the storage 110 is configured to store both raw (unmodified image) and the corresponding modified image.

A processor buffer (not shown) may also be used to store the image data. The pictures can be downloaded to the external device via the I/O port 114 or via the wireless channels using the antenna 118. In one embodiment, both unmodified and modified images are downloaded to the external device when the external device sends a command to download images from the camera device 110. In one embodiment, the camera device 100 may be configured to start capturing a series of images at a selected interval In one embodiment, a raw image from the sensor 104 is inputted to an image processor (such as an ISP) for image processing or blur detection. After image processing is applied to the image outputted by the image processor, the modified image is encoded. The image encoding is typically performed to compress the image data.

In an example embodiment, the camera device 100 may not include the components for processing the image captured by the sensor 104. Instead, the camera device 100 may include programming instructions to transmit the raw image after extracting the image from the sensor 104 to a cloud based processing system that is connected to the camera device 100 via the Internet or a local area network. The cloud based system is configured to receive the raw image and process the image or images as described above and below. The encoded image is then either stored in a selected cloud based storage or the image is sent back to the camera device 100 or to any other device according to a user configuration. The use of a cloud based image processing system can reduce a need for incorporating several image processing components in each camera device, thus making a camera device lighter, more energy efficient and cheaper.

In another example embodiment, instead of a cloud based image processing, the camera device 100 may send either a raw image or the image processed through an image processor to another device, e.g., a mobile phone or a computer. The image may be transmitted to the mobile phone (or a computer) for further processing via Wi-Fi, Bluetooth or any other type of networking protocol that is suitable for transmitting digital data from one device to another device. After the mobile device receives the image or images, according to one or more embodiments described herein, the produced image may be saved to local storage on the device, transferred for storage in a cloud based storage system, or transmitted to another device, according to user or system configurations.

In one embodiment, the native image processing system in the camera device 100 may produce images and/or videos in a non-standard format. For example, a 1200×1500 pixel image may be produced. This may be done by cropping, scaling, or using an image sensor with a non-standard resolution. Since methods for transforming images in a selected standard resolution are well-known, there will be no further discussion on this topic.

Various embodiments described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media. Accordingly, non-statutory forms of media such as carrier waves and signals per se are not intended to be covered by the term "computer-readable storage medium".

As noted above, camera device 100 can assume any suitable form of camera, such as a wearable or mountable camera. The camera can be worn in any suitable location relative to a user. For example, the camera can be worn on a user's head such as, by a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing or other items carried by a user, such as a backpack, purse, briefcase, and the like. Alternately or additionally, the camera can be mounted on various objects, such as objects that move, e.g., vehicles, animals, conveyances and the like.

In the example provided just below, a wearable camera is described in the context of a camera that is mountable on the user's clothing. It is to be appreciated and understood, however, that other types of non-clothing mountable or wearable cameras can be utilized without departing from the spirit and scope of the claimed subject matter.

Figure 2:
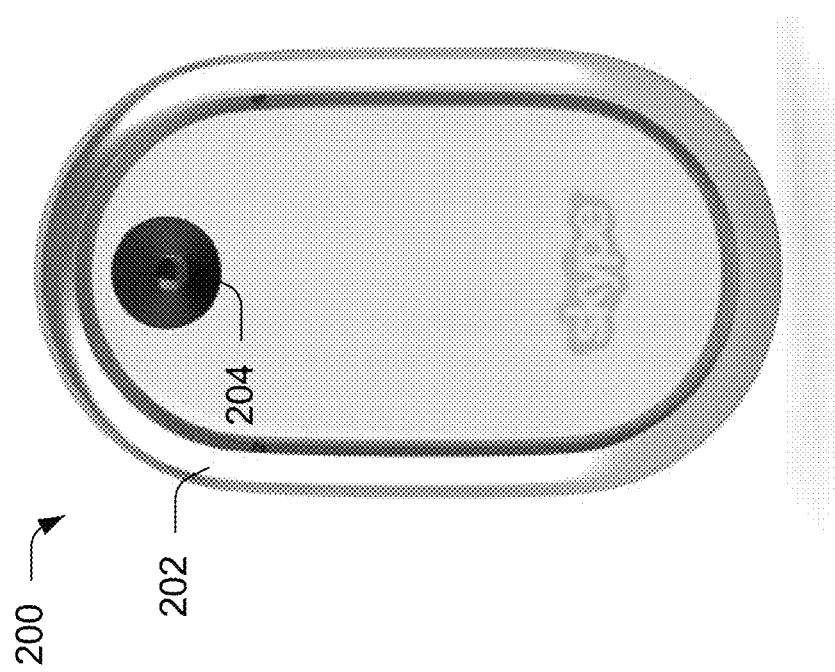
FIG. 2 illustrates an example camera device in accordance with one or more embodiments.
Figure 3:
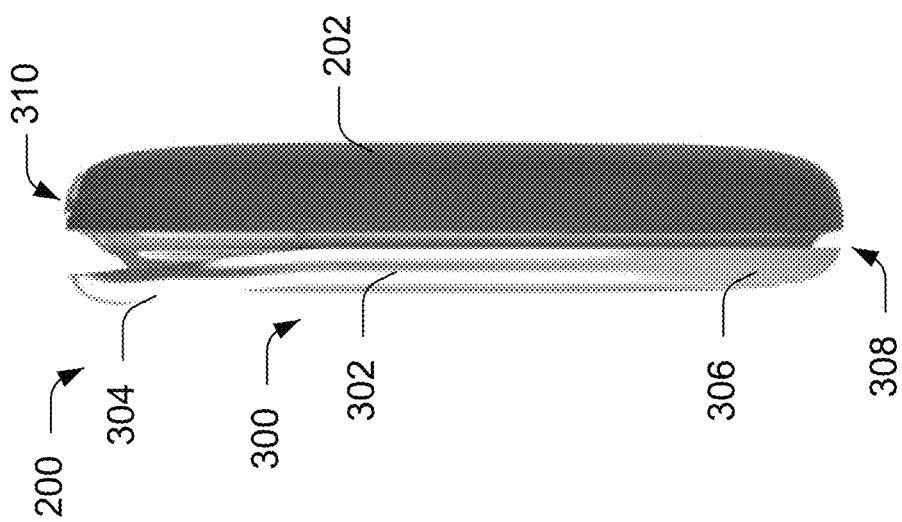
FIG. 3 illustrates an example camera device in accordance with one or more embodiments.

Moving on to FIGS. 2 and 3, consider the following. FIG. 2 illustrates an example camera device 200 in a front elevational view, while FIG. 3 illustrates the camera device 200 in a side elevational view. The camera device 200 includes a housing 202 that contains the components described in FIG. 1. Also illustrated is a camera lens 204 (FIG. 2) and a fastening device 300 (FIG. 3) in the form of a clip that operates in a manner that is similar to a clothespin. Specifically, the fastening device 300 includes a prong 302 with a body having a thumb-engageable portion 304. The body extends along an axis away from the thumb-engageable portion 304 toward a distal terminus 306. A spring mechanism, formed by the body or separate from and internal relative to the body, enables prong 302 to be opened responsive to pressure being applied to the thumb-engageable portion 304. When opened, a piece of clothing can be inserted into area 308. When the thumb-engageable portion 304 is released, the clothing is clamped in place by the prong 302 thereby securely mounting the camera device on a piece of clothing. For example, the camera device can be mounted, as described above, on a necktie, blouse, shirt, pocket, and the like.

In addition, camera device 200 can include a number of input buttons shown generally at 310. The input buttons can include, by way of example and not limitation, an input button to take a still picture and an input button to initiate a video capture mode. It is to be appreciated and understood that the various input buttons can be located anywhere on the camera device 200.

It may be noted that even though the camera device 200 is shown to have a particular shape, the camera device 100 can be manufactured in any shape shape and size suitable and sufficient to accommodate the above described components of the camera device 100. The housing 202 of the camera device may be made of a metal molding, a synthetic material molding or a combination thereof. In other embodiments, any suitable type of material may be used to provide a durable and strong outer shell for typical portable device use.

In addition, the fastening device 300 can comprise any suitable type of fastening device. For example, the fastening device may be a simple slip-on clip, a crocodile clip, a hook, a Velcro or a magnet or a piece of metal to receive a magnet. The camera device 200 may be affixed permanently or semi-permanently to another object using the fastening device 300.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the camera device 200 may include a computer-readable medium that may be configured to maintain instructions that cause the camera's software and associated hardware to perform operations. Thus, the instructions function to configure the camera's software and associated hardware to perform the operations and in this way result in transformation of the software and associated hardware to perform functions. The instructions may be provided by the computer-readable medium to the camera device through a variety of different configurations.

One such configuration of a computer-readable medium is signal bearing medium and thus is configured to transmit the instructions (e.g., as a carrier wave) to the camera device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Dual Encoding

In one or more embodiments, the camera device's processor 106 (FIG. 1) is configured to encode image data at different levels of resolution. For example, the camera device can encode image data at a low level of resolution and at a high level of resolution as well. Any suitable levels of resolution can be utilized. In at least some embodiments, the low level of resolution is Quarter-VGA (e.g., 320×240) and the high level of resolution is 720 p (e.g., 1280×720).

Encoding image data at different resolutions levels can enhance the user's experience insofar as giving the user various options to transfer the saved image data. For example, at lower resolution levels, the captured image data can be streamed to a device such as a smart phone. Alternately or additionally, at higher resolution levels, when the user has Wi-Fi accessibility, they can transfer the image data to a network device such as a laptop or desktop computer.

Having considered a dual encoding scenario, consider now aspects of a photo log that can be constructed using the principles described above.

Photo Log

Photo log refers to a feature that enables a user to log their day in still photos at intervals of their own choosing. So, for example, if the user wishes to photo log their day at every 3 minutes, they can provide input to the camera device so that every 3 minutes the camera automatically takes a still photo and saves it. At the end of the day, the user will have documented their day with a number of different still photos.

Having considered an example photo log feature, consider now how this feature can be used in connection with the camera embodiments described below.

Taking Photo Clusters and Selecting Images Based on Image Processing

In one or more embodiments, a camera such as the one described above, can capture clusters of photographs. Capturing the clusters of photographs can be performed in different ways.

For example, in at least some embodiments clusters of photographs can be captured automatically in connection with a feature such as the photo log feature described just above. As an example, consider a situation in which the user sets the camera to automatically take a photograph every three minutes. When the time comes to take a photograph, instead of taking just one photograph at the three-minute point, the camera can take a cluster of photographs. Any suitable number of photographs can constitute a cluster, e.g., 5, 10, 15, or more photographs.

Alternately or additionally, instead of capturing a cluster of photographs in connection with an automatic photo-capturing mode, clusters of photographs can be captured when the user physically takes a photograph. For example, the user may point the camera in a certain direction and press a record button to take a photograph. Responsive to this input, the camera may capture a cluster of photographs.

In one or more embodiments, when a cluster of photographs is captured, whether through an automatic photo-capturing mode or in response to a user manually taking the photograph, image processing techniques can be utilized to ascertain an amount of blur in each photograph. Any suitable image processing techniques can be utilized.

For example, blur detection techniques can be utilized that detect blur within digital images using wavelet transform and/or Cepstrum analysis blur detection techniques. These techniques are able to detect motion blur and/or out-of-focus blur. Specifically, using these techniques portions of a photograph or digital image are accessed and processed to determine if the image is blurred based on a wavelet transform blur detection process and/or a Cepstrum analysis blur detection process. Using this approach, the wavelet transform blur detection process includes wavelet transforming at least the portion of the digital image to produce a plurality of corresponding different resolution levels. Each resolution level includes a plurality of bands. The wavelet transform blur detection process also includes generating at least one edge map for each of the resolution levels, and detecting blur in the digital image based on the resulting edge maps.

In certain implementations, for example, the Cepstrum analysis blur detection process includes dividing the image into a plurality of parts and determining a Cepstrum for each of the parts. In certain implementations, the Cepstrum analysis blur detection process also includes blurring at least one boundary within the image and calculating an elongation of each resulting binarized Cepstrum image. The technique may further include determining that the image includes motion blur and/or out-of-focus blur based on the calculated elongations. An example technique for performing this analysis is described in U.S. Pat. No. 7,257,273.

Once the blur analysis has been conducted on each of the images or photographs of the cluster, an image or photograph can be selected having the least amount of blur.

It is to be appreciated and understood that the image processing, i.e. blur analysis, can occur on board the camera. Alternately or additionally, the image processing can occur on a computing device remote from the camera, e.g., a user's personal computing device, a remote server, a cloud service, and the like.

The above-described approach can be particularly useful in scenarios where the camera is prone to movement. For example, in the context of a wearable camera, much of the time the user may be moving around. In these instances, the user's movement may not be uniform. For example, the user may be walking, stop for a moment, and then continue walking. If the camera is in automatic photo-capturing mode and one of the instances to take a photograph occurs during this time, taking a cluster of photographs during this non-uniform movement increases the chance that a non-blurred photograph will be captured.

Figure 4:
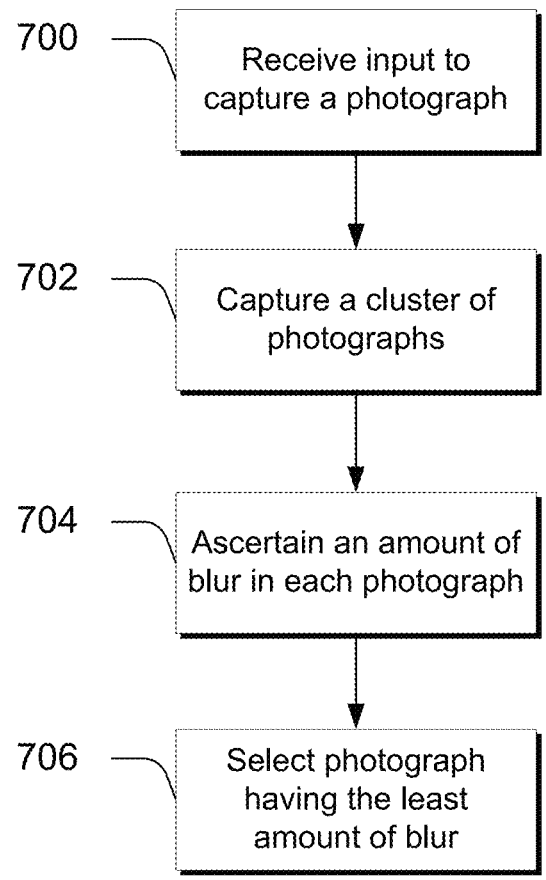
FIG. 4 is a flow diagram that describes steps in a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, aspects of the method can be performed by a suitably-configured camera, such as the one described above. Alternately or additionally, aspects of the method can be performed by a suitably-configured computing device, examples of which are provided above.

Step 700 receives input to capture a photograph. This step can be performed in any suitable way. For example, in at least some embodiments, the input to capture the photograph can be received in connection with an automatic photo-capturing mode. Alternately or additionally, the input received can be generated based on a user's input to physically capture a photograph.

Responsive to receiving the input to capture photograph, step 702 captures a cluster of photographs. Any suitable number of photographs can constitute a cluster of photographs. Once the cluster of photographs has been captured, step 704 ascertains an amount of blur in each photograph. The step can be performed either on the camera or by the camera, or by a computing device that is remote from the camera. An example of a blur detection technique is described above. It is to be appreciated and understood, however, that any suitable blur detection technique can be utilized without departing from the spirit and scope of the claimed subject matter. Once the amount of blur has been ascertained for each photograph, step 706 selects a photograph having the least amount of blur.

Having described embodiments in which clusters of photographs can be taken and images selected based on image processing techniques, consider now embodiments that utilize a gyroscope and/or accelerometer to determine camera motion and whether to take an automatic photo.

Using an Accelerometer and/or Gyroscope to Determine Camera Motion

As noted above, the photo log feature enables photographs to be taken automatically at periods of time that may or may not be specified by a user. Because a user may be in motion some of the time during the automatic photo-capturing mode, techniques can be employed to ascertain when to take a photograph to reduce the chances of a blurred image.

In at least some embodiments, the camera can include an accelerometer such as that described above. The accelerometer is utilized to detect linear motion. The accelerometer can be utilized to detect whether or not the camera is moving, or the amount of camera movement, during the automatic photo-capturing mode. Based on the motion detected by the accelerometer, a decision can be made whether or not to capture photograph. For example, when in the automatic photo-capturing mode, photos can be captured when the camera is detected to be motionless or when movement is slight.

In at least some embodiments, the camera can include a gyroscope such as that described above. The gyroscope is utilized to detect angular motion. The gyroscope can be utilized to detect whether or not the camera is moving, or the amount of camera movement, during the automatic photo-capturing mode. Based on the motion detected by the gyroscope, a decision can be made whether or not to capture photograph. For example, when in the automatic photo-capturing mode, photos can be captured when the camera is detected to be motionless or when movement is slight.

In at least some other embodiments, the camera can include both an accelerometer and a gyroscope. Input from both the accelerometer and the gyroscope can be utilized to ascertain when to capture a photo. For example, when in the automatic photo-capturing mode, photos can be captured when the camera is detected to be motionless or when movement is slight.

Figure 5:
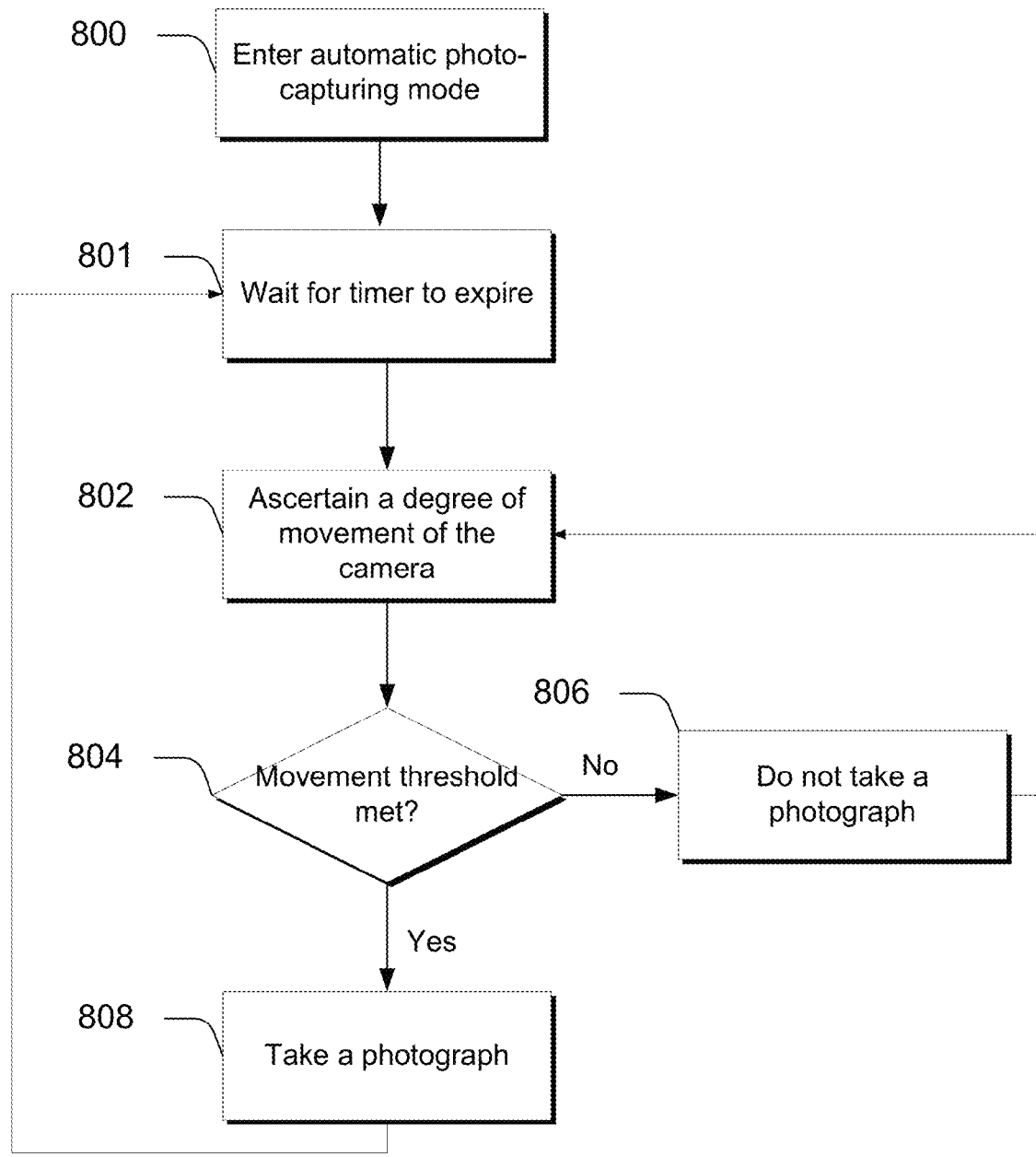
FIG. 5 is a flow diagram that describes steps in a method in accordance with one or more embodiments.

FIG. 5 is a flow diagram that describes steps in a method in accordance with one or more embodiments. The method can be performed in connection with any suitable hardware, software, firmware, or combination thereof. The method can be performed by a suitably-configured camera, such as the one described above.

Step 800 enters, with a camera, an automatic photo-capturing mode. This step can be performed by receiving user input to enter the automatic photo-capturing mode. An example of such a mode is described above. Step 801 waits for a timer to expire, thus providing an input that it is time to take a photograph. Step 802 ascertains a degree of movement of the camera. This step can be performed in any suitable way. For example, camera movement can be ascertained through the use of an accelerometer. Alternately, camera movement can be ascertained through the use of a gyroscope. Alternately, camera movement can be ascertained through the use of both an accelerometer and gyroscope.

Step 804 ascertains whether a movement threshold is met. Any suitable movement threshold can be utilized. For example, movement thresholds may be automatically set to a particular value by the camera. Alternately or additionally, movement thresholds may be set to a particular value by a user. Further, movement thresholds may be set to be relative as between movement data captured for the camera. For example, a time window may be defined and a movement threshold may be set as a percentage of an amount of movement within the time window.

Responsive to the movement threshold not being met, i.e. there being greater camera movement than desired, step 806 does not take a photograph and the method returns to step 802. Responsive to the movement threshold being met, i.e. there being little or no camera movement, step 808 takes a photograph and the method returns to step 801.

The techniques described just above can mitigate the effects of camera movement on the quality of photographs taken.

Having considered embodiments in which an accelerometer and/or gyroscope are utilized to determine camera motion for purposes of capturing images, consider now embodiments that utilize motion data associated with the camera in connection with the level of brightness in a camera's environment to determine whether and how to adjust the camera's shutter time.

Using Motion Data and Brightness to Adjust Camera Shutter Time

As will be appreciated by the skilled artisan, one can improve the amount of blur by decreasing the shutter time of the camera. The downside to this approach is that the amount of light that gets absorbed by the photo sensor is reduced so that the photograph is typically darker. In one or more embodiments, movement data associated with the camera's movement and data associated with the ambient brightness relative to the camera can be utilized to adjust the exposure time or shutter speed of the camera. This allows for a trade-off between motion blur and the level of brightness.

As example, consider the following. By ascertaining the camera's motion as described above, and considering the ambient brightness relative to the camera, photographs might be taken in conditions where the camera is moving outside of a desired movement threshold, yet the ambient brightness is high. Any suitable algorithm that considers the camera's motion and ambient brightness can be utilized.

Figure 6:
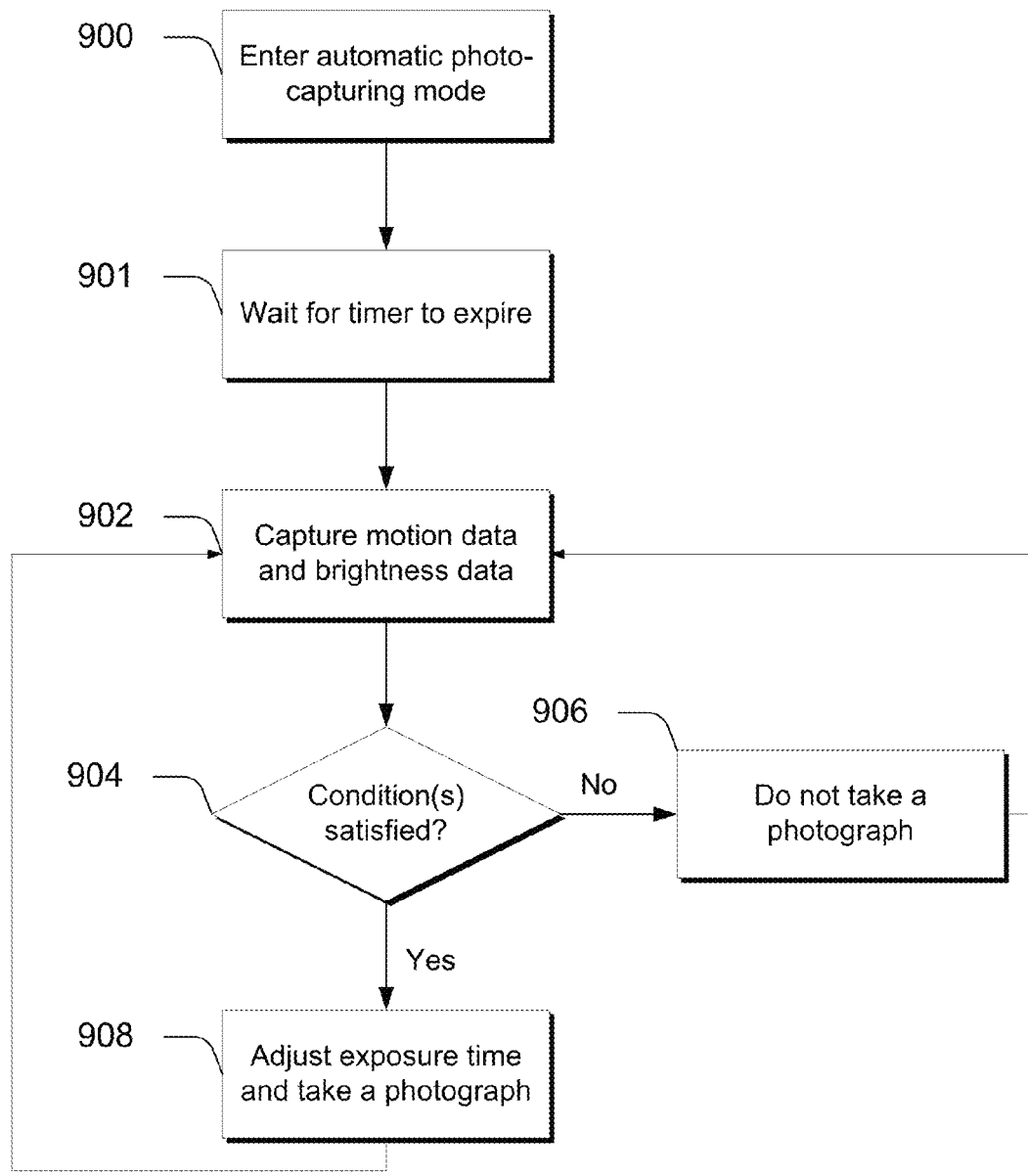
FIG. 6 is a flow diagram that describes steps in a method in accordance with one or more embodiments.

FIG. 6 is a flow diagram that describes steps in a method in accordance with one or more embodiments. The method can be performed in connection with any suitable hardware, software, firmware, or combination thereof. The method can be performed by a suitably-configured camera, such as the one described above.

Step 900 enters, with a camera, an automatic photo-capturing mode. This step can be performed by receiving user input to enter the automatic photo-capturing mode. An example of such a mode as described above. Step 901 waits for a timer to expire, thus providing an input that it is time to take a photograph. Step 902 captures motion data and brightness data associated with the camera. This step can be performed in any suitable way. For example, camera movement can be ascertained through the use of an accelerometer. Alternately, camera movement can be ascertained through the use of a gyroscope. Alternately, camera movement can be ascertained through the use of both an accelerometer and gyroscope. Further, brightness data computed from light captured by the camera's photo sensor or an ambient light sensor.

Step 904 ascertains whether one or more conditions are satisfied. Any suitable conditions can be utilized. For example, an algorithm that is employed to analyze the motion data and brightness data can have tunable parameters that define desirable motion conditions and desirable brightness conditions.

Responsive to the condition(s) not being satisfied, step 906 does not take a photograph and the method returns to step 902. For example, if the environment is ascertained to be dark and there is a high degree of motion, then the photograph may not be taken. Responsive to the condition(s) being satisfied, step 908 adjusts the camera's exposure time and takes a photograph. For example, if the environment is bright and there is a high degree of motion, then a faster exposure time can be used to take the photograph. Likewise, if the environment is dark and there is a low degree of motion, then a slower exposure time can be used to take the photograph. The method then returns to step 902.

The techniques described just above can mitigate the effects of camera movement and light on the quality of photographs taken.

Conclusion

Various embodiments provide a camera that is configured to take a cluster of photographs and use image processing techniques to select a photograph with a lesser amount of blur than other photographs in the cluster.

In yet other embodiments, a camera includes one or more of a gyroscope or accelerometer. The gyroscope and/or accelerometer is utilized to ascertain the camera's motion. Motion data associated with the camera's motion is utilized to ascertain when to take an automatic photograph.

Various other embodiments provide a camera that is configured to adjust exposure time, i.e., shutter time, based on input associated with the camera's motion and the level of brightness in the camera's environment.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A computer-implemented method comprising:
   receiving a captured cluster of photographs;
   ascertaining an amount of motion blur in each photograph; and
   selecting a photograph, from the captured cluster of photographs, based on an ascertained amount of motion blur in each of the received photographs; and
   based on a user configuration, sending the selected photograph to a device.

2. The method of claim 1, wherein the selected photograph has the least amount of ascertained motion blur.

3. The method of claim 1, wherein said receiving the captured cluster of photographs is receiving the captured cluster of photographs at a cloud-based system to perform said selecting.

4. The method of claim 1, wherein said receiving the captured cluster of photographs, receiving the captured cluster of photographs at a mobile device to perform said selecting.

5. The method of claim 4, further comprising storing the selected photograph on the mobile device.

6. The method of claim 1, wherein the selected photograph is sent to a wearable camera that captured the cluster of photographs.

7. The method of claim 1, wherein the selected photograph is sent to a device other than the wearable camera.

8. A system comprising:
   a camera device; and
   a computing device configured to:
      receive a captured cluster of photographs from the camera device;
      select a photograph, from the captured cluster of photographs, with the least amount of ascertained motion blur in the received cluster of photographs; and
      based on a user configuration, send the selected photograph to a device.

9. The system of claim 8, wherein the computing device is configured to send the selected photograph to a device other than the camera device.

10. The system of claim 8, wherein the device is the camera device and wherein the computing device is configured to send the selected photograph to the camera device.

11. The system of claim 10, wherein the camera device is further configured to:
    receive the selected photograph from the computing device; and
    store the selected photograph.

12. The system of claim 8, wherein the camera device is configured to capture the cluster of photographs using an automatic photo-capture mode.

13. The system of claim 8, wherein the camera device is configured to capture the cluster of photographs in response to a user input.

14. The system of claim 13, wherein said receiving the user input is performed in connection with the automatic photo-capturing mode.

15. The system of claim 14, wherein the user input is performed based on a user's physical input to capture a photograph.

16. The system of claim 8, wherein the camera device is a wearable camera that is configured to be mounted on a user's clothing.

17. The system of claim 8, wherein the camera device is a wearable camera that is configured to be mounted on a location other than a user's clothes.

18. The system of claim 8, wherein the received captured cluster of photographs is received over a Wi-Fi or a Bluetooth communication link.

19. The system of claim 8, wherein the computing device is a remote server of a cloud-based service and the received captured cluster of photographs is received over the Internet.

20. A computing device configured to:
    receive a captured cluster of photographs from a wearable camera device;
    ascertain an amount of motion blur in each photograph in the cluster of photographs;
    select a photograph based on the ascertained motion blur in the received cluster of photographs; and
    send the selected photograph to the wearable camera device, effective to enable the wearable computing device to store the selected photograph in place of the captured cluster of photographs.

* * * * *